(12) United States Patent
Gibeley et al.

(10) Patent No.: US 7,492,395 B2
(45) Date of Patent: *Feb. 17, 2009

(54) METHOD OF PROVIDING PHOTOFINISHING SERVICES USING RECYCLED DIGITAL CAMERA MEMORY DEVICES

(75) Inventors: Marc M. Gibeley, Alpharetta, GA (US); Steven L. Mizelle, Pittsford, NY (US); John R. Fredlund, Rochester, NY (US); Joseph A. Manico, Rochester, NY (US); Robert P. Cloutier, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 711 days.

This patent is subject to a terminal disclaimer.

(21) Appl. No.: 10/666,388

(22) Filed: Sep. 19, 2003

(65) Prior Publication Data
US 2005/0062859 A1 Mar. 24, 2005

(51) Int. Cl.
*H04N 5/76* (2006.01)
*G03B 17/02* (2006.01)

(52) U.S. Cl. ............................. 348/231.2; 348/231.99; 396/6

(58) Field of Classification Search .............. 348/231.8, 348/231.2, 231.99; 396/6
See application file for complete search history.

(56) References Cited

U.S. PATENT DOCUMENTS

| | | | | |
|---|---|---|---|---|
| 4,870,257 A * | 9/1989 | Maginness et al. | ........... | 235/375 |
| 4,894,920 A * | 1/1990 | Butler et al. | ............. | 33/203.11 |
| 6,199,148 B1 | 3/2001 | Naito | | |
| 6,243,839 B1 | 6/2001 | Roohparvar | | |
| 6,297,870 B1 * | 10/2001 | Nanba | ........................ | 355/18 |
| 6,644,455 B2 * | 11/2003 | Ichikawa | ..................... | 194/205 |
| 6,842,186 B2 * | 1/2005 | Bouchard et al. | ........... | 347/188 |
| 6,950,129 B1 * | 9/2005 | Minne et al. | ............. | 348/231.7 |
| 6,970,186 B1 * | 11/2005 | Silverbrook | ............. | 348/207.2 |
| 7,013,288 B1 * | 3/2006 | Reifel et al. | ................... | 705/26 |
| 7,126,629 B1 * | 10/2006 | Braunstein et al. | ........ | 348/207.1 |
| 7,139,095 B1 * | 11/2006 | Hunter | ....................... | 358/1.18 |
| 2001/0009602 A1 * | 7/2001 | Nakayama | .................... | 386/46 |
| 2001/0022617 A1 * | 9/2001 | Takaba et al. | ............... | 348/207 |

(Continued)

FOREIGN PATENT DOCUMENTS

EP 1 054 556 11/2000

(Continued)

OTHER PUBLICATIONS

Patent Abstracts of Japan vol. 2003, No. 12, Dec. 5, 2003 & JP 2003 242238 (Hitachi Ltd.) Aug. 29, 2003.

*Primary Examiner*—Lin Ye
*Assistant Examiner*—Kelly L. Jerabek
(74) *Attorney, Agent, or Firm*—Thomas H. Close; Stephen H. Shaw

(57) ABSTRACT

A method of supplying photofinishing services includes the steps of supplying a memory device for a digital camera to a photographer; the photographer taking and storing a plurality of digital images on the memory device; the photographer delivering the memory device containing the digital images to a photofinisher; the photofinisher producing prints of the digital images and returning the prints to the photographer; and the photofinisher erasing the digital images from the memory device and supplying the memory device to another photographer to repeat the steps of taking images and delivering the memory device to the photofinisher.

29 Claims, 4 Drawing Sheets

U.S. PATENT DOCUMENTS

| | | | |
|---|---|---|---|
| 2001/0040625 A1* | 11/2001 | Okada et al. ................. 348/207 |
| 2001/0041072 A1* | 11/2001 | Takano ....................... 396/429 |
| 2002/0054346 A1 | 5/2002 | Fredlund |
| 2002/0080250 A1 | 6/2002 | Ogawa et al. |
| 2002/0180873 A1 | 12/2002 | Misawa |
| 2002/0197076 A1 | 12/2002 | Manico et al. |
| 2003/0001957 A1* | 1/2003 | Kubota .................... 348/207.2 |
| 2003/0025808 A1* | 2/2003 | Parulski et al. ......... 348/231.99 |
| 2003/0048358 A1* | 3/2003 | Shirai ..................... 348/207.1 |
| 2003/0061566 A1* | 3/2003 | Rubstein et al. .......... 715/500.1 |
| 2003/0086706 A1* | 5/2003 | Kinjo ........................ 396/420 |
| 2003/0107674 A1 | 6/2003 | Creed et al. |
| 2003/0151669 A1* | 8/2003 | Robins et al. .......... 348/207.99 |
| 2004/0201683 A1* | 10/2004 | Murashita et al. ........ 348/207.1 |

FOREIGN PATENT DOCUMENTS

| | | |
|---|---|---|
| EP | 1 139 649 | 10/2001 |
| EP | 1 146 457 | 10/2001 |
| EP | 1 164 778 | 12/2001 |
| EP | 1213910 A1 | 6/2002 |
| EP | 1 278 365 | 1/2003 |
| JP | 05093950 A * | 4/1993 |
| WO | WO 01/15440 | 3/2001 |
| WO | 03/024083 A2 | 3/2002 |

* cited by examiner

METHOD OF PROVIDING PHOTOFINISHING SERVICES USING RECYCLED DIGITAL CAMERA MEMORY DEVICES

FIELD OF THE INVENTION

The present invention relates to a method of providing photofinishing services, and more particularly to a method of providing photofinishing services for users of digital cameras.

BACKGROUND OF THE INVENTION

Photographic film has a long history of providing a means of capturing images. The light sensitive nature of photographic film has provided consumers with a good means of image capture at a reasonable cost. The nature of image capture on film is inherently one time use. The exposed film must be chemically processed to provide images to the consumer, and the film loses its light capturing ability in the processing step.

One time use cameras (OTUCs) are a popular means of enjoying photography. Single use cameras provide ready availability and good image reproduction at a low cost for a photographic system. Film-based OTUC systems have been available for many years, and have provided consumers with an easy way to capture images and receive prints.

Digital cameras use electronic sensors to capture images. The signals captured are digitized and stored as digital data, usually in removable non-volatile memory cards. Due to the cost of the memory cards and reusable capacity, they are not typically used for long term storage. Usually data from the memory card is saved to another data storage means such as a PC hard drive or a CD. At any time, the memory card can be cleared of stored data and reused for additional image capture. This is a primary advantage of digital capture. The disadvantage of digital capture is that if prints are desired, the mechanisms for printing are tedious and confusing for the average consumer. In addition, many of the home printing solutions lack the image permanence consumers have grown accustomed to from photographic printing technology.

Local printing at a home PC is fraught with difficulties since a many step process is usually necessary. Additionally, the process is time consuming and can be expensive when the cost of materials is considered. Online printing presents another set of difficulties. Image uploads are often time consuming and confusing. In addition, the volatile nature of the on-line image storage industry has left many consumers with no access to their on-line image account when the company has ceased operations.

Images from memory cards can be printed at retail establishments. This is not often preferred because of the time necessary to download images from the card, and also for the selection process of choosing the images that are desired for printing and choosing from a variety of print formats and image products. In addition, if a photo kiosk such as the "Kodak Picture Maker" is used, queuing and the lack of privacy may present obstacles to the user. The card can be dropped off at a retail establishment for later printing, but the cost of the card is high enough that most consumers are reluctant to purchase a second card to use while the other one is at the printer, or to risk losing the card at the printer.

Recently, fully digital one time use cameras (DOTUCs) have appeared on the market; see for example EP 1212910A1, Hirata et al., published Jun. 12, 2002, and WO 03/024083A2, Braunstein, et al., published Mar. 20, 2003. These are DOTUCs that provide the one time use benefits previously provided by film systems. These systems capture images with an electronic sensor and store the digital image files in digital memory. Because of the high value of the camera and memory, these systems force the consumer to return the camera to the retailer before the images can be accessed. Often the images are in encrypted form and are completely inaccessible to the consumer until the camera is returned. In addition no means is provided to review the images with the camera since, unlike most digital cameras, no image display is provided. Furthermore, the DOTUCs are designed to take a fixed number of images, such as 25, and no contingency is provided to add more memory, such as by adding a new memory card, or extracting the digital image files from the camera by anyone other than the retailer.

What is needed is a system that allows for the ease of use and ready availability of the film system for obtaining prints while maintaining the flexibility of the digital system for viewing and sharing images.

SUMMARY OF THE INVENTION

The need is met by providing a method of supplying photofinishing services that includes the steps of supplying a memory device for a digital camera to a photographer; the photographer taking and storing a plurality of digital images on the memory device; the photographer delivering the memory device containing the digital images to a photofinisher; the photofinisher producing prints of the digital images and returning the prints to the photographer; and the photofinisher erasing the digital images from the memory device and supplying the memory device to another photographer to repeat the steps of taking images and delivering the memory device to the photofinisher.

DETAILED DESCRIPTION OF THE INVENTION

Figure 1:
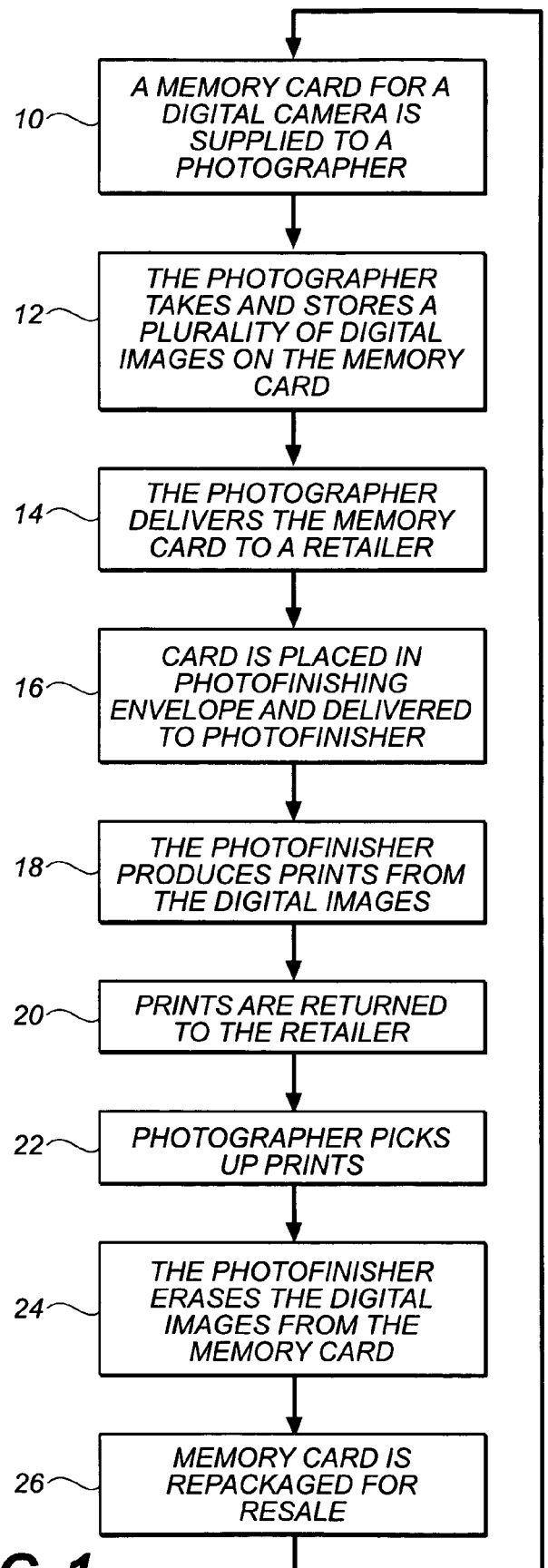
FIG. 1 is a flow chart describing a method of delivering photofinishing services according to the present invention.

Referring to FIG. 1, the present invention is directed to a system for recycling reusable memory devices such as magnetic, optical, and solid state memory such as an EEPROM for digital cameras. The following description describes the use of a memory card containing a solid state memory, however any reusable memory device can be employed. The one time use memory card is sold with a commitment to create prints from the images that are captured and stored on the memory card. The one time use memory card may be of several different well-known formats such as CF, MMC, SD, xD, Memory Stick. In step 10, the user buys the one time use memory card that is appropriate for his camera. This one time use memory card is inserted in the removable memory card slot in the user's camera. In step 12, pictures are taken and stored on the one time use memory card in the usual fashion. When the user is done capturing images, the user returns the card to a retail photofinishing counter in step 14.

The card is placed in a photofinishing envelope with the user's name and other pertinent information and the envelope is picked up and delivered to a photofinisher in step 16. Alternately, the photofinisher may be at the same location as the retail photofinishing counter. The photofinisher reads the image files from the one time use card and prints images from these files in step 18. In a preferred embodiment, the photofinisher also creates a CD of the image files. It is understood that other imaging services such as creating a CD may be included when this example mentions creation of prints. In step 20, the prints and CD are placed in the envelope and shipped back to the retailer. The user picks up the prints and CD at the photofinishing counter in step 22.

Alternatively the user may insert the one time use memory card into an image kiosk such as the Kodak Picture Maker, which produces prints and CDs from prints and from one time use memory cards. The retailer may also choose to provide "while you wait" printing using a digital minilab or any other suitable printer such as a thermal dye transfer printer and CD or DVD writer.

The one time use memory card is retained by the photofinisher and recycled for resale. The recycling operation includes step 24, erasure of the memory card so that image data from the user will not be available to the next user buying the memory card or recoverable by more sophisticated means. The recycling operation may also include a verification of the useful capacity of the one time use memory card by writing a test pattern to the one time use memory card and then reading it back. The writing of the test pattern may also erase the card. The one time use memory card is cleared of image files before resale. The memory card may also be inspected for any visual or cosmetic defects and sanitized to prevent the spread of contact transmitted germs. The photofinisher may also include in the memory a record of how many times the memory card has been recycled. The memory card is then repackaged and provided for resale in step 26. The memory card is returned to the retailer to be repurchased in step 10.

Figure 10:
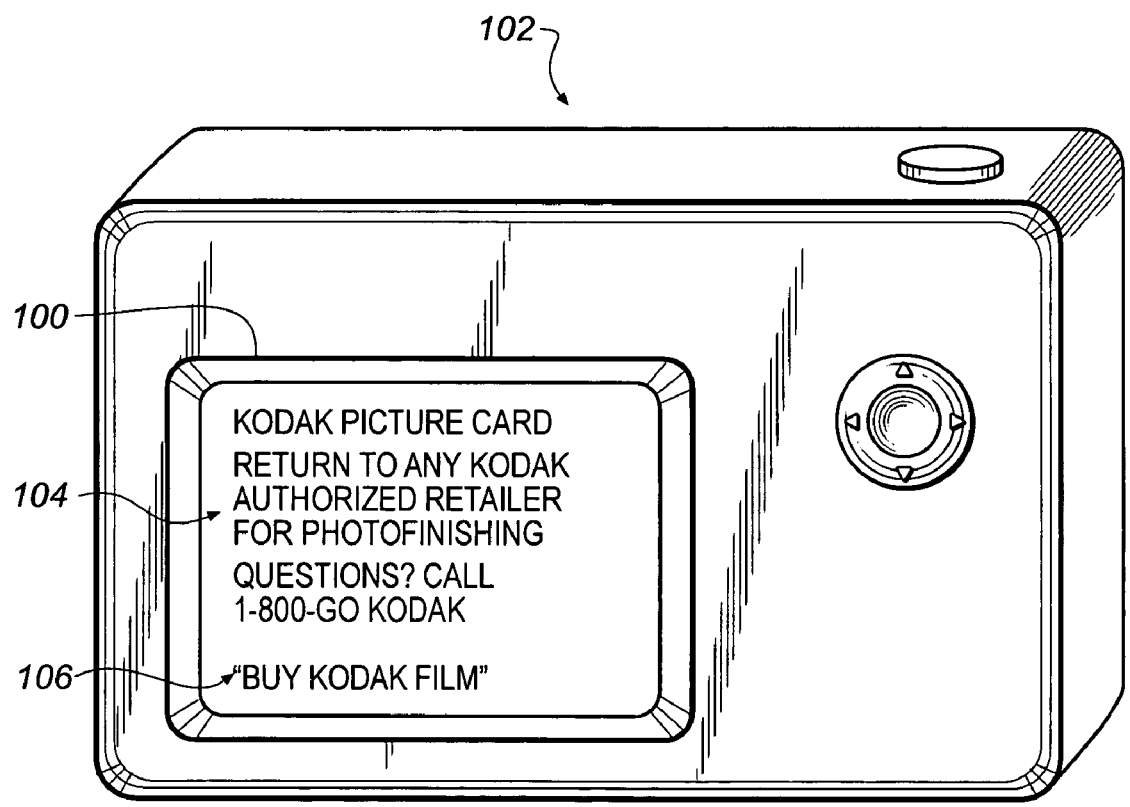
FIG. 10 shows a digital camera displaying a prerecorded image from the memory device.

Referring to FIG. 10, an image can also be prerecorded on the one time use memory card that can be viewed by the customer on a camera display 100 when the card is placed in a camera 102. The pre-recorded image can be, for example, instructions 104 to the customer for using the photofinishing services of the present invention. Alternatively, the message can be paid advertising 106.

Figure 2:
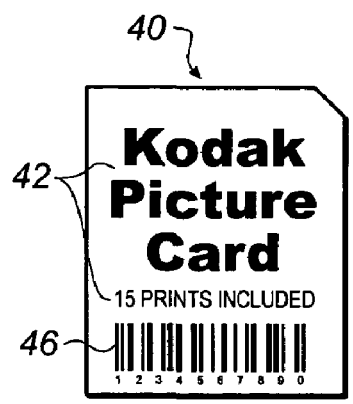
FIG. 2 is schematic diagram of a memory device useful with the present invention.

The commitment to create prints can take many forms. The graphics 42 on the one time use memory card may indicate that the one time use memory card carries with it a commitment to create prints as shown in FIG. 2. When one time use memory card 40 is received at the retail photofinishing counter, graphics 42 indicate that prints will be created. Thus the user need only fill out a photofinishing bag and include the one time use memory card 40 since graphics 42 will alert the photofinisher that prints are to be created.

Figure 3:
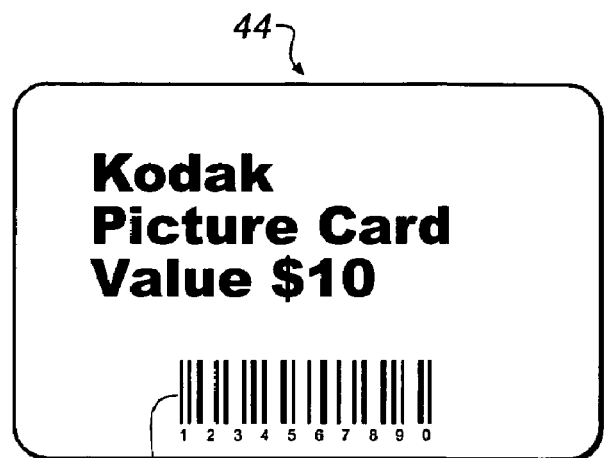
FIG. 3 is a schematic diagram of a prepaid debit card useful with the present invention.
Figure 4:
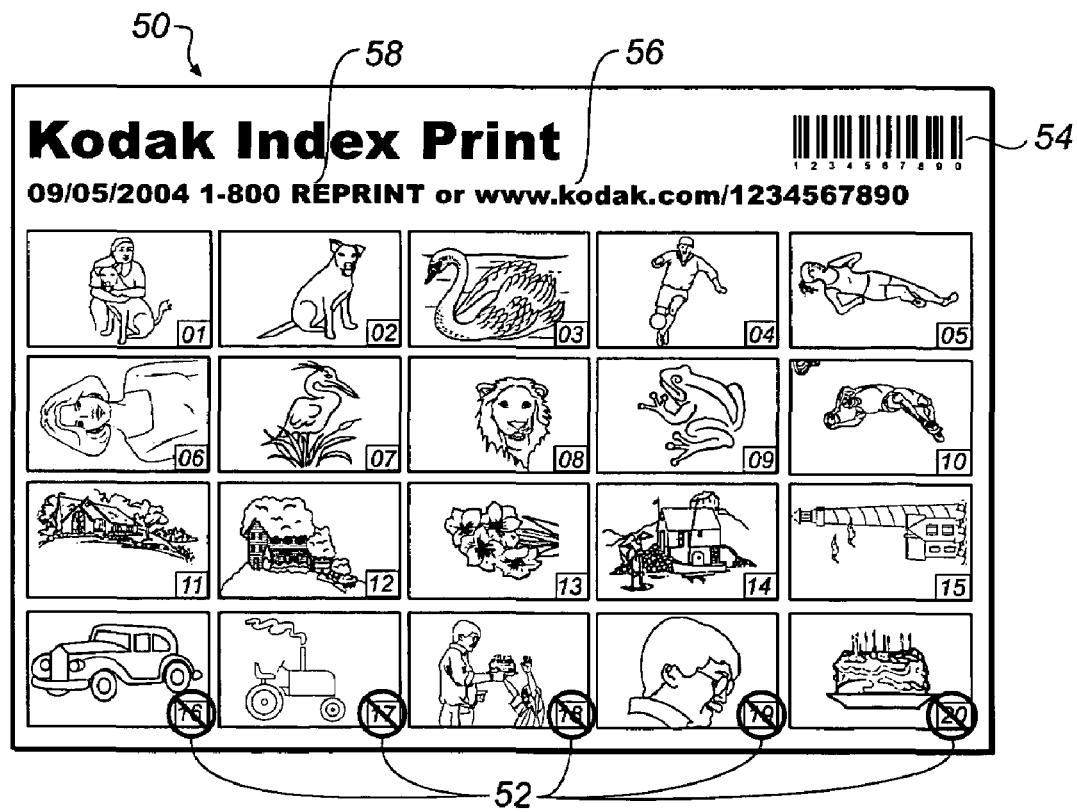
FIG. 4 is an index print useful with the present invention.

As shown in FIG. 3, another manner of communicating the commitment to create prints is to include debit card 44 with memory card 40 at the time of sale. In this example, the images on memory card 40 will only be printed without additional cost if debit card 44 is produced at the retail counter when the user returns the one time use memory card 40.

A code 46 on the one time use memory card 40 may also indicate to the photofinisher that memory card 40 carries with it the commitment to create prints. Additionally, code 46 can take the form of an ID or similar number or file that resides on the card. The photofinisher may query the one time use memory card 40 to determine if memory card 40 carries with it the commitment to create prints. If the code corresponds to a valid code saved in a database at the photofinisher, then the photofinisher will create the prints. The code is placed on the card before the time of first sale and then again during the recycling operation. This code may be hidden from the user by residing in a pseudo bad sector of the card. That is to say that the controller of the card will not allow the user to access the portion of the card where the ID or file resides. This information may also be stored as a "hidden file". In addition, this code may be stored as a machine and or eye readable unique ID number, alphanumeric sequence, or encrypted code printed on an external surface of the memory card.

When the user captures images, he may capture more or less than a pre-defined number for which prints are promised. In the case where the user captures more than the pre-defined number, only the pre-defined number is printed. For the purpose of this example, the pre-defined number of prints is 15. If 20 image files reside on the one time use memory card, only the most recent 15 will be printed. Alternatively, the 15 first images will be printed. In both cases, when the images are printed, if a CD is created, the CD may contain all the images that are on the one time use memory card. Thus no image files are lost, and the user maintains the ability to print the additional images by accessing the image files on the CD.

An index print 50 can be included with the order and the extra images may be included on index print 50. Index print 50 could include graphic or textual information 52 indicating which images had been printed or which images had not been printed. Index print 50 includes instructions on how prints or other imaging services may be obtained for the additional images (not shown). These instructions will include access code 54 and website 56 or phone number 58 that allows the user to order additional prints.

In the case where one time use memory card 40 is returned with less than the predefined number of image files, a credit for the additional images can be returned with the prints. This credit can take the form of a coupon good for a reduction in price of the next purchase of a one time use memory card. The credit could be applied to a second debit card such similar to debit card 44, but this second debit card is included in the return envelope with the prints instead of being included with the purchase of the one time use memory card 40.

The invention allows the user to capture and delete images as usual with any memory card. The user can download images from the card and share via email as usual. Preferably, the usage of the card and the images is not restricted. The images are not encrypted in any fashion to restrict usage. The images on the card need not be captured by the user, but can also be from other sources such as shared image files from the cameras of friends.

Figure 5:
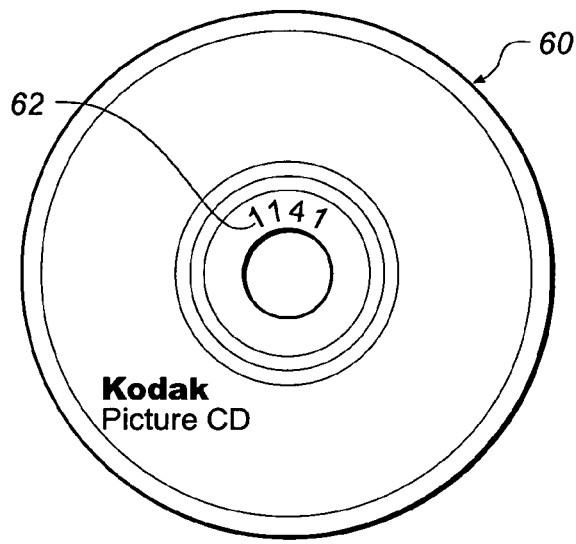
FIG. 5 is a CD useful with the present invention.
Figure 6:
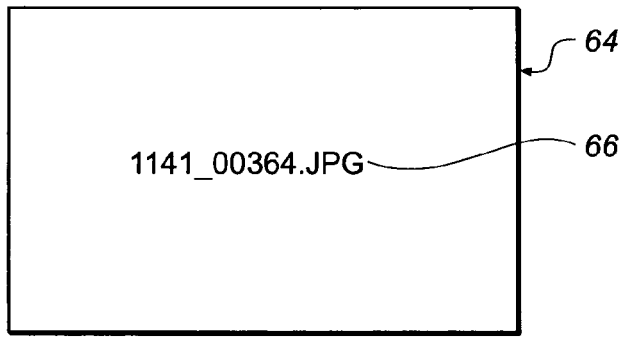
FIG. 6 is a view of the back of a photographic print having an image identifier useful with the present invention.

The prints returned to the user may have an indication of the source file. For example, CD 60 with identifier 62 shown in FIG. 5 is returned along with the prints created from image files on memory card 40. As shown in FIG. 6, each print 64 may have identifier 66 printed on the back that indicates which CD 60 contains the image file corresponding to the print, and which file on CD 60 corresponds to the print. Thus determining the image file for reprinting and sharing is facilitated.

Figure 7:
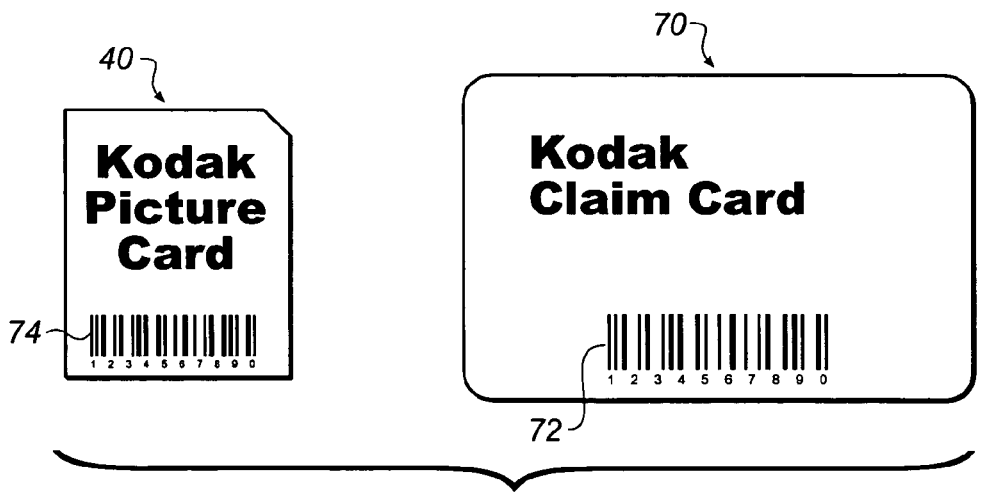
FIG. 7 is a schematic diagram of a memory device and a claim card useful with the present invention.

Additional features can be included with the card when it is sold to improve ease of use. As shown in FIG. 7, a claim card 70 may be included with the one time use memory card 40. The claim card has ID 72 that is human or machine readable. Memory card 40 also contains the same ID, either as graphic 74 or in memory. When memory card 40 is returned to the photofinisher, the user need not fill out any information on the photofinishing bag if he has retained claim card 70. Memory card 40 is placed in the bag and the photofinisher creates the prints as usual. After the prints are returned, the user need only present claim card 70 to pick up his prints. If the user loses the claim card, then he must fill out the photofinishing bag.

Figure 8:
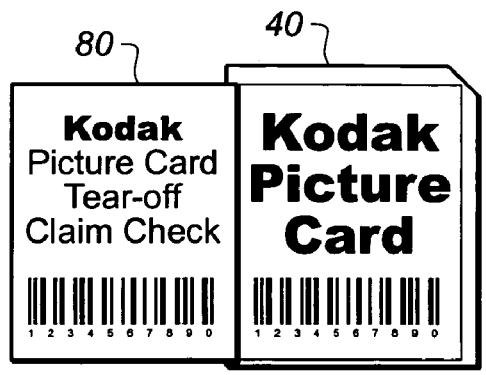
FIG. 8 is a schematic diagram of a memory device having a tear off claim check useful with the present invention.

As shown in FIG. 8, this same effect may be obtained if memory card 40 has tear-off or otherwise removable label 80. Label 80 can be removed from the card and kept in the possession of the user. After the prints are returned, the user need only present the label to pick up his prints. This technique may also be used as prepayment verification means such, as a coupon redeemable for prints.

Figure 9:
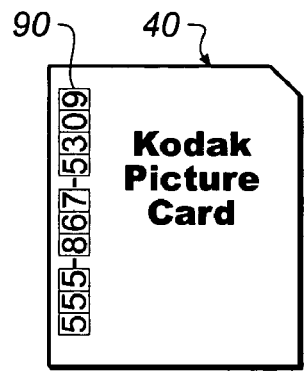
FIG. 9 is a schematic diagram of a memory device having an area for writing a phone number useful with the present invention.

Another means of minimizing the amount of data necessary for insuring that the prints are returned to the proper user is to require a phone number 90 of the user on the photofinishing envelope (not shown) or memory card 40, as shown in FIG. 9. Unique phone number 90 including area code can be used to track the photofinishing order, and can also be used to alert the user that his prints are available for pickup. The user's email address will also serve this purpose. These unique IDs can also be written on card 40. Phone number 90 can also be used by the manufacturer and retailer to obtain demographic information about customers.

The invention has been described in detail with particular reference to certain preferred embodiments thereof, but it will be understood that variations and modifications can be effected within the spirit and scope of the invention.

PARTS LIST 10 supply memory card step
12 take pictures and store on memory card step
14 deliver memory card to retailer step
16 deliver memory card to photofinisher step
18 produce prints step
20 return prints to retailer step
22 photographer picks up prints step
24 photofinisher erases images from memory card step
26 repackage memory card for resale step
40 one time use memory card
42 graphics
44 bit card
46 code
50 index print
52 information
54 access code
56 website
58 phone number
60 CD
62 identifier
64 print
66 identifier
70 claim card
72 ID
74 ID
80 label
90 phone number
100 camera display
102 camera
104 instructions
106 advertisement

What is claimed is:

1. A method of providing photofinishing services, comprising the steps of:
    a) supplying to a photographer at least one removable memory device selected from a variety of available formats and having a format appropriate for use in a digital camera provided by the photographer;
    b) the photographer selectively photographing and storing, and optionally deleting some or all of, a plurality of digital images on the at least one removable memory device;
    c) the photographer delivering the at least one removable memory device containing undeleted ones of the digital images to a photofinisher, including the steps of the photofinisher reading a code stored on the removable memory device and accessing a database having stored therein data corresponding to the code for verifying that the removable memory device carries with it a commitment to create prints; and
    d) the photofinisher producing prints of the digital images and returning the prints to the photographer.

2. The method claimed in claim 1, further comprising the steps of the photofinisher producing an index print and/or CD of the digital images from the at least one removable memory device and returning the index print and/or CD to the photographer.

3. The method claimed in claim 2, wherein the at least one removable memory device contains a number N of digital images and also indicates that a number M of prints have been promised, where M is less than N, but the index print and/or the CD contain all N of the digital images on the at least one removable memory device.

4. The method claimed in claim 3, wherein the index print and/or the CD contain all N of the digital images on the at least one removable memory device and indicates which images have or have not been printed.

5. The method claimed in claim 1, wherein the at least one removable memory device comprises a CF, MMC, SD, xD, or Memory Stick format.

6. The method claimed in claim 1, wherein the at least one removable memory device bears a graphic that indicates to the photofinisher that the device carries with it a commitment to create prints.

7. The method claimed in claim 1, wherein the at least one removable memory device is returned to the photofinisher having a number of stored digital images less than a predefined number of image files, and further including the step of providing a credit to the photographer for a difference between the number of stored digital images and the predefined number.

8. The method claimed in claim 7, wherein the credit is in the form of a debit card that is returned with the prints.

9. The method claimed in claim 1, wherein a debit card for photofinishing services is supplied to the photographer along with the at least one removable memory device and the debit card is presented to the photofinisher along with the at least one removable memory device.

10. The method claimed in claim 1, wherein the at least one removable memory device includes a first portion of memory that is electronically readable by a supplier and the photofinisher but not by the digital camera provided by the photographer, and a second portion of memory that is electronically readable by the supplier, the photofinisher, and the digital camera provided by the photographer.

11. The method claimed in claim 10, wherein the first portion of memory contains the code.

12. The method claimed in claim 10, wherein the first portion of memory contains a number indicating a number of times that the at least one removable memory device has been recycled.

13. The method claimed in claim 10, wherein the first portion of memory contains instructions for the photofinisher provided by the supplier.

14. The method claimed in claim 1, further comprising the steps of supplying a claim card for retrieving photofinishing services to the photographer along with the at least one removable memory device and presenting the claim card to the photofinisher to retrieve the photofinishing services.

15. The method claimed in claim 1, further comprising the steps of supplying a removable tag for retrieving photofinishing services to the photographer along with the at least one removable memory device and presenting the removable tag to the photofinisher to retrieve the photofinishing services.

16. The method claimed in claim 1, further comprising the step of writing an identifier unique to the photographer on the at least one removable memory device and presenting the identifier unique to the photographer to the photofinisher to retrieve the photofinishing services.

17. The method claimed in claim 1, further comprising the step of writing a phone number or e-mail address of the photographer on the at least one removable memory device and presenting the phone number or e-mail address to the photofinisher to retrieve the photofinishing services.

18. The method claimed in claim 1, further comprising the step of writing a phone number or e-mail address of the photographer on a photofinishing envelope and presenting the phone number or e-mail address to the photofinisher to retrieve the photofinishing services.

19. The method claimed in claim 1, wherein the step of erasing the digital images from the at least one removable memory device includes writing a test pattern onto the at least one removable memory device.

20. The method claimed in claim 1, wherein the at least one removable memory device includes a digitally stored prerecorded image to be electronically displayed on a display screen of the digital camera provided by the photographer.

21. The method claimed in claim 20, wherein the prerecorded image contains instructions to the photographer for using the photofinishing services.

22. The method claimed in claim 20, further comprising the step of selling advertising space in the prerecorded image.

23. The method claimed in claim 1, wherein the at least one removable memory device includes the code in a file hidden from electronic access by the digital camera or in a pseudo bad sector of its memory that is inaccessible electronically by the digital camera.

24. The method claimed in claim 1, further comprising the steps of the photofinisher producing an index print and CD of the digital images from the at least one removable memory device and returning the index print and CD to the photographer, wherein the index print includes a printed filename of a corresponding image file recorded on the CD.

25. The method claimed in claim 1, further comprising the steps of the photofinisher producing at least one print and a CD of the digital images from the at least one removable memory device and returning the at least one print and CD to the photographer, and indicating on the at least one print a filename of a corresponding image file recorded on the CD.

26. An apparatus comprising:
a digital camera including a removable memory card;
the removable memory card comprising a first portion of memory that is electronically readable by a photofinishing services provider but not by the digital camera, and a second portion of memory that is electronically readable by the photofinishing services provider and by the digital camera; and
the first portion of memory comprising a code for indicating to the photofinishing services provider that the removable memory card carries with it a commitment to create prints.

27. The apparatus of claim 26, wherein the code in the first portion of memory corresponds to a code saved in a database of the photofinishing services provider for verifying that the removable memory card carries with it the commitment to create prints.

28. An apparatus comprising:
a memory card capable of being electronically coupled to a digital camera;
the memory card comprising a first portion of memory that is electronically readable by a photofinishing services provider but not by the digital camera, and a second portion of memory that is electronically readable by the photofinishing services provider and by the digital camera; and
the first portion of memory comprising a code for indicating to the photofinishing services provider that the memory card carries with it a commitment to create prints.

29. The apparatus of claim 28, wherein the code in the first portion of memory corresponds to a code saved in a database of the photofinishing services provider for verifying that the memory card carries with it the commitment to create prints.

* * * * *